Oct. 5, 1965 G. MEHNERT 3,209,401
BLOWING NOZZLE FOR BLOWING MACHINES
Filed Nov. 4, 1963 3 Sheets-Sheet 2

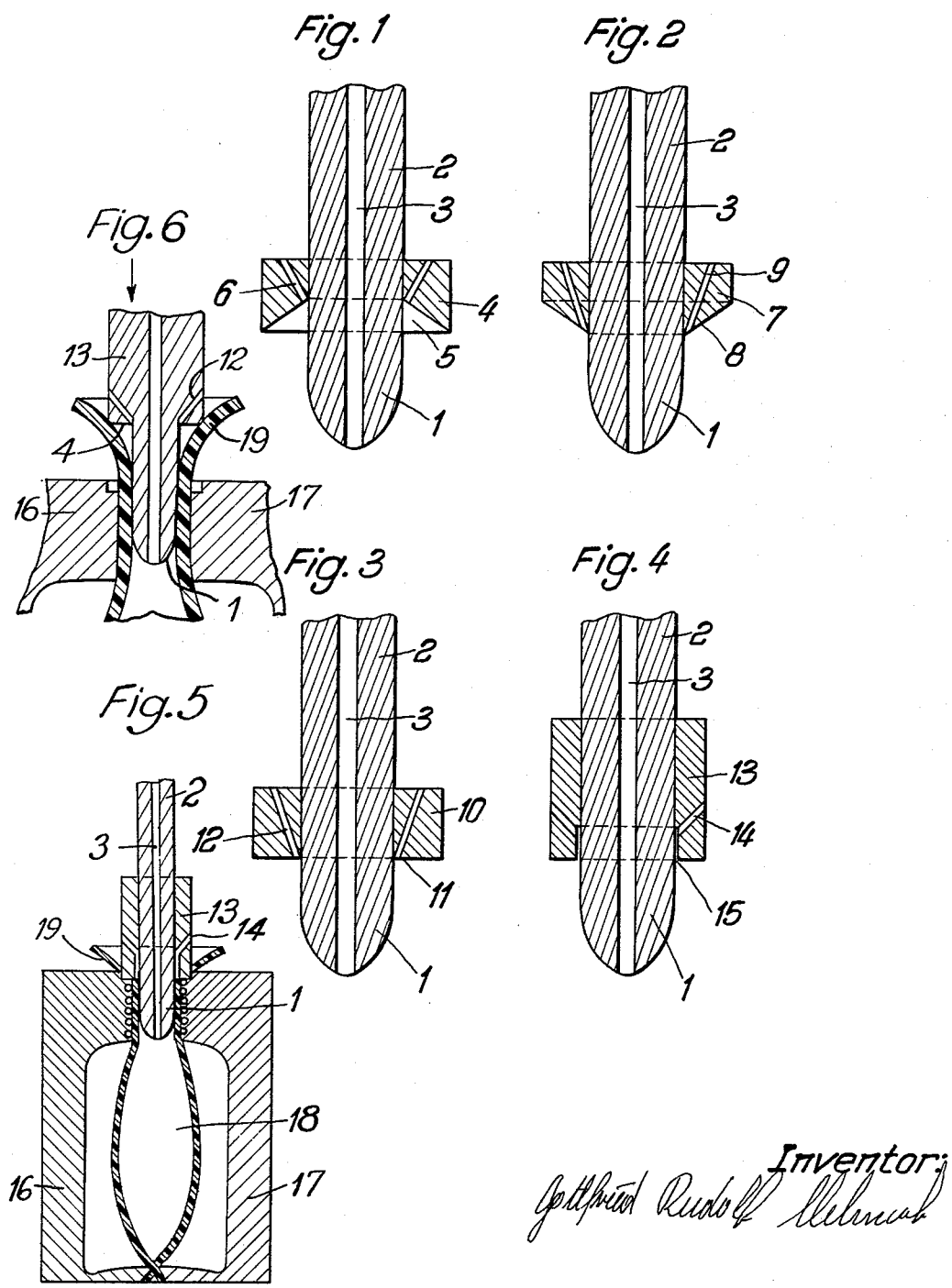

INVENTOR.
Gottfried R. Mehnert
BY
Michael J. Striker

Oct. 5, 1965 G. MEHNERT 3,209,401
BLOWING NOZZLE FOR BLOWING MACHINES
Filed Nov. 4, 1963 3 Sheets-Sheet 3

INVENTOR.
Gottfried R. Mehnert
BY
Michael S. Striker

United States Patent Office 3,209,401
Patented Oct. 5, 1965

3,209,401
BLOWING NOZZLE FOR BLOWING MACHINES
Gottfried Mehnert, Lankwitzerstrasse 14/15,
Berlin-Mariendorf, Germany
Filed Nov. 4, 1963, Ser. No. 322,003
Claims priority, application Germany, July 14, 1960,
M 45,925; Aug. 5, 1963, M 57,737
11 Claims. (Cl. 18—5)

The present application is a continuation-in-part application of the copending application Serial No. 114,175 filed with the same title on June 1, 1961 and now abandoned.

The present invention relates to a blowing nozzle for machines for blowing bottles or similar containers especially from thermoplastic material.

In blowing of bottles or similar containers, a tubular body of plastic material may be placed between two cooperating mold halves spaced from each other which are then closed to squeeze one end of the tubular body closed while the other open end of the tubular body extends through an opening of the closed mold beyond the outer mold surface. A blowing nozzle is then inserted into the open flaring end of the tubular body and compressed air is fed through the blowing nozzle into the interior of the tubular body to expand the latter against the inner surface of the cavity formed in the mold.

Blowing nozzles are also known which have a calibrating end portion of a transverse cross section corresponding to that of the interior of the neck of the container or bottle to be blown, which calibrating end portion cooperates with the inner surface of the opening in the mold to confine between its outer surface and said inner surface the neck of the container to be blown from the tubular body in the mold.

Blowing nozzles are also known which have rearwardly of the aforementioned calibrating portion a cut-off portion of a transverse cross section greater than that of the calibrating portion and which cooperates with a portion of the mold around the opening to cut off during insertion of the blowing nozzle into the flaring end of the tubular body of plastic material and into the opening of the mold a portion of the tubular body extending beyond the outer mold surface.

During insertion of such a blowing nozzle in the flaring open end of the tubular body, air located in the space in the flaring portion around the calibrating portion of the nozzle will be compressed during inward movement of the nozzle after the cut-off portion of the nozzle has contacted the flaring end portion and this compressed air is quite often pressed into the material forming the neck of the container, resulting in undesirable air enclosures in the container neck or in irregularities in the surface thereof.

It is one object of the present invention to overcome this disadvantage of blowing nozzles according to the prior art.

It is a further object of the present invention to provide a blowing nozzle having a calibrating portion and a cut-off portion and which is so constructed to avoid compression of air in the region of the neck of the container to be formed during insertion of the blowing nozzle into the open end of the tubular body from which the container is to be blown.

An additional object of the present invention is to form cut-off portion of the blowing nozzle and the portions of the mold halves around the opening or inlet passage, through which the open end of the tubular body in the mold extends, in such a manner that the end face of the cut-off portion will cooperate with the surface of the inlet passage during insertion of the blowing nozzle thereinto to provide a clean cut off of the excess material of the tubular body and to form a perfectly smooth end face on the neck of the container.

With these objects in view the present invention includes a blowing nozzle for insertion into the open flaring end of a tubular body of plastic material having a closed end in a blow mold, which blowing nozzle has a calibrating portion of a transverse cross section smaller than that of the opening in the mold through which the open end of the tubular body extends to the outside of the latter, and this calibrating portion is adapted to cooperate with the inner surface of the opening to confine between its outer surface and the inner surface of the opening a neck of a container to be blown from the tubular body in the mold. The blowing nozzle has a further cut-off portion rearwardly and coaxially arranged with the aforementioned calibrating portion, which cut-off portion has a transverse cross section greater than that of the calibrating portion and a bottom face extending transversely to the axis of the blowing nozzle and adapted to cooperate with a portion of the mold around the opening to cut off during insertion of the blowing mold nozzle into the flaring open end of the body a portion thereof extending beyond the outer mold surface. During insertion of the calibrating portion into the flaring open end of the tubular body of plastic material, air located in the space in the flaring portion around said calibrating portion will be compressed during inward movement of the blowing nozzle after the cut-off portion of the nozzle has contacted the inner surface of the flaring end portion of the tubular body, and according to the present invention the blowing nozzle is formed with air escape passage means communicating at one end thereof with the aforementioned space and at another end thereof with the outer atmosphere so that air compressed in said space can escape to the outer atmosphere, whereby forcing of air into the material forming the neck of the container is positively avoided and a neck portion free of folds and air enclosures is obtained.

The escape passage means lead preferably from points of the bottom face of the cut-off portion closely adjacent to the outer surface of the calibrating portion outwardly through the cut-off portion to the outer surface of the latter.

Further features of the present invention reside in the specific configuration of the cut-off portion and the surfaces of the inlet passage in the mold. The inlet passage of the mold may have an outer flaring end portion and an inner substantially cylindrical portion blending into the small diameter end of the flaring outer end portion. In this case the cut-off portion has preferably an end face of a diameter smaller than the largest diameter of the flaring end portion, but greater than the smallest diameter thereof so that during insertion of the blowing nozzle into the inlet passage the outer edge of the end face of the cut-off portion will cooperate with the inner surface of the outer end portion of the inlet passage to cut off the excess material of the tubular body extending beyond the inner portion of the inlet passage.

The inlet passage may also have an outer cylindrical end portion of a diameter greater than an inner coaxial portion of the inlet passage to form between the inner and outer portions a transverse shoulder face and in this case an annular rim of substantially triangular cross section is formed on the shoulder face projecting therefrom and forming a cut off edge of a diameter equal to that of the inner portion of the inlet passage. In this case, the cut-off portion has preferably an end face normal to the axis of the blowing nozzle and adapted to abut against the aforementioned cutting edge during full insertion of the blowing nozzle into the inlet passage to perform the cut-off operation. On the other hand, the shoulder face between the inner and outer portion of the inlet passage may be formed perfectly plane and the corresponding cutting edge may be formed on the bottom face of the cut-off portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1–4 are longitudinal cross sections through blowing nozzles according to the present invention and showing cut-off portions of different configurations;

FIG. 5 is a longitudinal cross section through the blowing nozzle as shown in FIG. 4, drawn to a smaller scale and showing this blowing nozzle inserted into a tubular body of plastic material located in a blow mold, this figure illustrating the arrangement during the cut-off operation;

FIG. 6 is a partial cross section similar to FIG. 5 and showing the arrangement of FIG. 5 during the start of the insertion of the blowing nozzle into the flaring end portion of the tubular body;

FIG. 8 shows also the end of a blowing nozzle to be inserted into the open flaring end of the tubular body;

Figure 7:
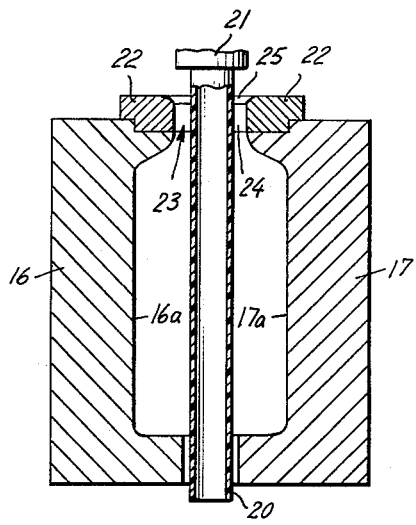
FIG. 7 is a longitudinal cross section through cooperating blow mold halves forming an inlet passage according to the present invention and FIG. 7 shows the halves in opened condition with a tubular body of plastic material located between the opened mold halves.

Referring now to the drawings and more particularly to FIGS. 1–4 of the same, it will be seen that the blowing nozzle of the present invention has a calibrating portion 1 and a shank portion 2 extending rearwardly of the calibrating portion. The free end of the calibrating portion is preferably rounded or tapered to facilitate insertion of the calibrating portion into the flaring end portion of a tubular body of plastic material from which the container or bottle has to be blown. The calibrating portion 1 and the shank portion 2 are formed with a central bore 3 therethrough to be connected at a rear end of the shank portion 2, not shown in the drawing, to a source of compressed air. Surrounding the lower part of the shank portion 2 is a cut-off portion shown in FIGS. 1–5 as a separate annular member, snugly engaging with an inner surface thereof the outer surface of the shank portion 2. While FIGS. 1–5 show the cut-off portion as a separate member, FIG. 6 shows the cut-off portion integral with the remainder of the blowing nozzle.

FIGS. 1–4 show cut-off members of different configuration. The cut-off member 4 shown in FIG. 1 has a bevelled bottom face 5 tapering in upward direction so as to form a cutting edge along its largest diameter. At least one, or two as shown in the drawing, or even a greater number of escape passages 6 are formed through the cut-off member 4 which lead from the bottom face 5 adjacent to the outer surface of the calibrating portion 1 through the cutoff portion 4 to the outer surface thereof.

FIG. 2 shows a cut-off member 7 of a slightly different configuration than that shown in FIG. 1. The cut-off member 7 shown in FIG. 2 has a bevelled bottom face 8 tapering in downward direction. The cut-off member 7 is again formed with air escape passages 9 therethrough leading from the bottom face 8 adjacent to the outer surface of the calibrating portion 1 to the outer surface of the cut-off member 7.

FIG. 3 shows a cut-off member 10 which has a bottom face extending in a plane normal to the axis of the blowing nozzle. The air escape passages 12 lead through the cut-off member 10 from a portion of the bottom face 11 adjacent to the outer surface of the calibrating portion 1 to the upper face of the cut-off member 10.

FIG. 4 shows a preferred construction of the air escape passages. As can be seen from FIG. 4, the inner surface of an upper portion of the annular cut-off member 13 tightly engages, preferably with a press or shrink fit, the outer surface of the shank portion 2 of the blowing nozzle, while the inner surface of the lower portion of the cut-off member is made with a diameter slightly greater than the outer diameter of the calibrating portion 1 so as to form an annular groove 15 open at the bottom face of the cut-off member 13. A plurality of inclined bores 14 extend from the upper end of the groove 15 upwardly through the wall of the cut-off member 13 to the outer peripheral surface thereof. The air escape passage means in this modification are therefore formed by the annular groove 15 and the bores 14 communicating therewith.

FIGS. 5 and 6 show the cooperation of the blowing nozzle according to the present invention with a tubular body of plastic material located in a blow mold formed with a cavity therein of a configuration according to the body of the container into which the tubular body is to be formed in the blow mold.

The blow mold comprises two cooperating mold halves 16 and 17 as shown in FIG. 5 defining between themselves a cavity of desired configuration. The mold halves 16 and 17 are movable in known manner by means, not shown in the drawing toward and away from each other and in the opened position of the mold halves a tubular body 18 of plastic material which may be extruded by any means known in the art is placed between the mold halves so that when the mold halves 16 and 17 are closed as shown in FIG. 5 the lower end of the tubular body 18 is squeezed closed as shown in FIG. 5, whereas the upper end of the tubular body extends through an inlet opening outwardly beyond the blow mold to form a flaring outer end 19 above the upper surface of the blow mold halves 16 and 17 as shown especially in FIG. 6. When a blowing nozzle is now inserted into the flaring open end 19 of the tubular body as shown in FIG. 6 so that the calibrating portion 1 of the blowing nozzle snugly engages the inner surface of the tubular body portion located in the inlet passage formed between the cooperating mold halves 16 and 17 and when during further movement of the blowing nozzle in the direction of the arrow shown in FIG. 6 the outer edge of the cut-off portion 13 of the blowing nozzle engages the inner surface of the flaring portion 19 of the tubular body an enclosed air space A will be formed between the outer surface of the upper portion of the calibrating portion 1, the bottom face of the cut-off portion 13 and the inner surface of the flaring portion 19 of the tubular body. During further inward movement of the blowing nozzle in the direction of the arrow shown in FIG. 6 the air in the space A will not be compressed, but the air may escape through the air escape passage 12 shown in FIG. 6, in which the cut-off portion is shown integral with the remainder of the blowing nozzle, or through the passage 15, 14 as shown in FIG. 5 in which the cut-off portion is shown as separate member 13 around the shank portion 2 of the blowing nozzle. In this way forcing of the air contained in the space A into the material forming the neck portion of the container is positively avoided and a neck portion free of folds or air enclosures is obtained.

During full insertion of the blowing nozzle into the inlet passage of the blow mold, as shown in FIG. 5 the bottom face of the cut-off portion 13 will cooperate with an outer end portion of the inlet opening to cut off the flaring end portion 19 from the remainder of the tubular body. After the flaring end portion 19 has been cut off and the neck portion of the container has been confined between the inner surface of the inlet passage and the outer surface of the calibrating portion 1 of the blowing nozzle, compressed air is fed through the bore 3 of the blowing nozzle into the interior of the tubular body 18 located in the cavity of the mold so that the body is expanded into engagement with the inner surface of the mold cavity. Afterwards the mold halves 16 and 17 are opened and the finished container is ejected by any means known in the art.

FIGS. 7–11 show further modifications of the present invention and these figures show specific constructions of the inlet passage of the blow mold and cut-off portions on the blowing nozzle cooperating therewith.

FIG. 7 shows a blow mold according to the present invention which comprises two complementary mold halves 16 and 17 having, respectively, an inner surface 16a, 17a which together define, when the two mold halves are brought into abutting engagement with each other, a cavity 26 having a shape corresponding to the shape of the bottle or container to be blown in the mold. A passage, herein also called inlet passage, 23 extends from the upper end of the mold cavity 26 to the exterior of the mold. This inlet passage 23 is preferably formed in complementary inserts 22 respectively mounted in upper portions of the mold halves 16 and 17. These inserts are preferably made from material harder than the remainder of the mold. The inlet passage 23 shown in FIGS. 7 and 8 has an outer end portion 25 of frusto-conical configuration and an inner portion 24 which is substantially cylindrical and which has a diameter equal to that of the small diameter of the frusto-conical end portion 25.

Figure 8:
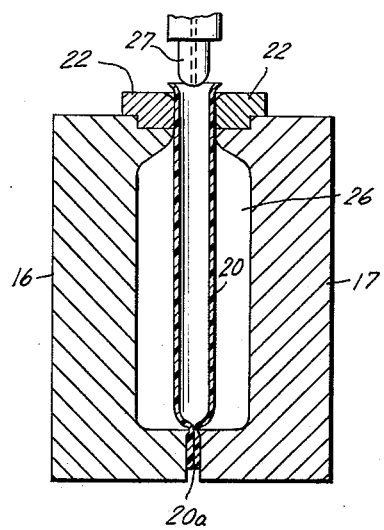
FIG. 8 is a longitudinal section similar to that shown in FIG. 7 in which the mold halves are closed squeezing the lower end of the tubular body closed.

FIG. 7 shows the mold opened and the two mold halves 16 and 17 are transversely spaced from each other. In this open position of the mold a tubular body of plastic material 20 is extruded by any extruder well known in the art from an extrusion nozzle 21, schematically indicated in FIG. 7, into the space between the open mold halves to extend with opposite ends beyond the top and the bottom of the mold halves. The upper end of the extruded plastic body 20 is then severed from the extrusion nozzle 21 by any means known in the art, while the mold halves 16 and 17 are simultaneously closed so that the bottom end of the extruded body 20 is squeezed between the mold halves as shown at 20a in FIG. 8 to form thereby a closed end of the tubular body in the mold cavity 26, whereas the upper open end of the tubular body extends through the passage 23 beyond the upper surface of the inserts 22. During the last part of the extrusion and during the closing of the mold halves compressed air is preferably blown into the tubular body 20 to prevent collapse of the same and so that the upper portion of the tubular body is tightly pressed against the inner surface of the inlet passage 23 while the upper end thereof is flared as shown in FIG. 8. A blowing nozzle 27 is then inserted into the upper open end of the tubular body 20.

Figure 9:
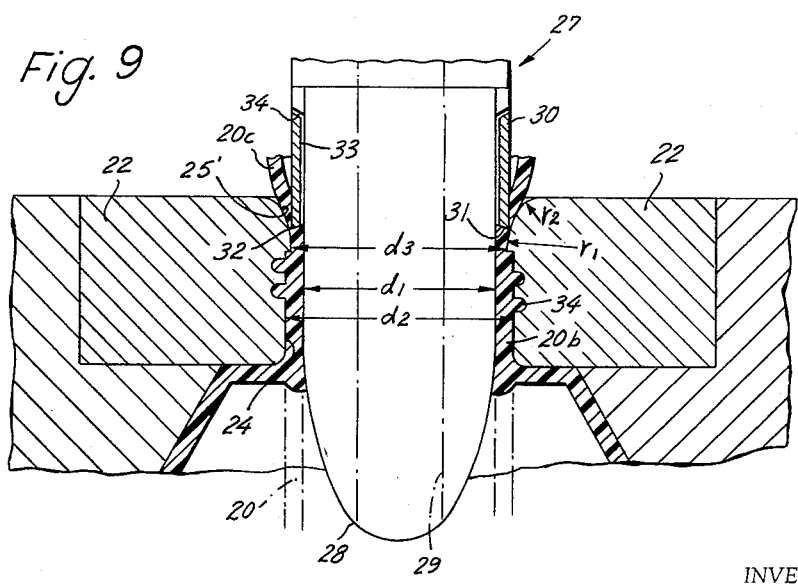
FIG. 9 is a partial cross section similar to FIG. 8, drawn to an enlarged scale and showing the blowing nozzle fully inserted into the inlet passage of the blow mold.

FIG. 9 shows the blowing nozzle 27 at an enlarged scale and its cooperation with the portion of the tubular body 20 extending through the inlet passage 23. The inlet passage shown in FIG. 9 differs slightly from that shown in FIGS. 7 and 8 in that the outer end portion 25' of the inlet passage is not frusto-conical as shown in FIGS. 7 and 8, but tapers inwardly along a curve having at its outer end a smaller radius of curvature $r2$ than the radius $r1$ at the inner end thereof so that this curve forms substantially part of a parabola. The inner portion 24 of the inlet passage is again cylindrical and this inner portion may have a diameter equal to the smallest diameter of the outer portion or, as shown, slightly greater than this diameter. If it is desired to form an outer screw thread on the neck of the container, the inner portion 24 of the passage may be formed with a groove 34, as shown in FIG. 9 having a substantially semi-circular or any other desired cross section and being arranged along a helix around the axis of the inlet passage.

The blowing nozzle 27 has a calibrating end portion 28 having a diameter $d1$ smaller than the diameter $d2$ of the inner portion 24 of the inlet passage by an amount substantially equal to twice the wall thickness of the tubular body 20 so that the portion 20b of the tubular body located in the inlet passage is tightly confined between the outer surface of the calibrating portion 28 and the inner surface of the inner portion 24 of the passage. The front end of the calibrating portion 28 is preferably curved or tapered as shown in FIG. 9 to facilitate insertion thereof into the open upper flaring end of the tubular body 20. The blowing nozzle 27 includes further a cut-off portion 30 located rearwardly of the calibrating portion coaxial therewith, and cutting portion 30 is shown in FIG. 9 as a separate sleeve member tightly placed around a rear extension of the calibrating portion 28. The cut-off portion or sleeve 30 engages only along an upper end portion thereof tightly the rear extension of the calibrating portion 28, whereas the lower portion of the sleeve 30 has an inner diameter slightly greater than that of the calibrating portion 28 so that an annular groove 33 open towards the bottom face 31 of the sleeve 30 is formed between the sleeve and the rear extension of the calibrating portion. The upper end of the groove 33 communicates through bores 34 with the outer surface of the sleeve 30. The outer diameter D of the sleeve 30 is slightly greater than the smallest diameter $d3$ of the outer portion 25' of the inlet passage. During movement of the blowing nozzle 27 in direction of the arrow shown in FIG. 9 into the open flaring end of the tubular body 20, the outer edge 32 of the bottom face of the sleeve or cut-off portion 30 will come in contact with the curving face of the outer end portion 25' of the inlet passage and thereby sever the portion 20c from the remainder of the tubular body. Contact of the cutting edge 32 with the face of the upper end portion 25' of the inlet passage will also stop further inward movement of the blowing nozzle so that compression of the portion 20b of the tubular body in axial direction will be prevented. The groove 33 and bores 34 form air escape passage means which will prevent, in the manner as described before in connection with FIGS. 5 and 6, pressing of air into the portion 20b of the tubular body so that a neck portion free of air enclosure and folds will be assured. At the same time, the bottom face 31 of the sleeve 30 will form a perfectly smooth upper surface on the neck.

If the upper end portion of the inlet passage 23 has a frusto-conical configuration 25 as shown in FIGS. 7 and 8, the cut-off portion of the blowing nozzle will cooperate with the conical face in the same manner as described in connection with FIG. 9 and obviously the outer diameter of the cut-off portion has to be made in this case slightly greater than the smallest diameter of the frusto-conical portion and slightly smaller than the largest diameter thereof. The tapering face 25 or 25' will also properly center the blowing nozzle 27 during insertion thereof in the inlet passage with respect to the latter.

Since the calibrating portion 28 is dimensioned to tightly confine the portion 20b of the tubular body between the outer surface of the calibrating portion and the inner surface of the lower portion 24 of the inlet passage, the calibrating portion is preferably covered with a lubricating film before insertion thereof into the upper open end of the tubular body 20. After the blowing nozzle 27 has been fully inserted as shown in FIG. 9, compressed air is blown through the bore 29 extending longitudinally through the blowing nozzle and the tubular body 20 is inflated and pressed against the inner surface of the mold cavity 26. After the bottle or container has thus been formed to the desired configuration, the mold halves 16 and 17 are opened and the finished container is ejected by any means known in the art.

Figure 10:
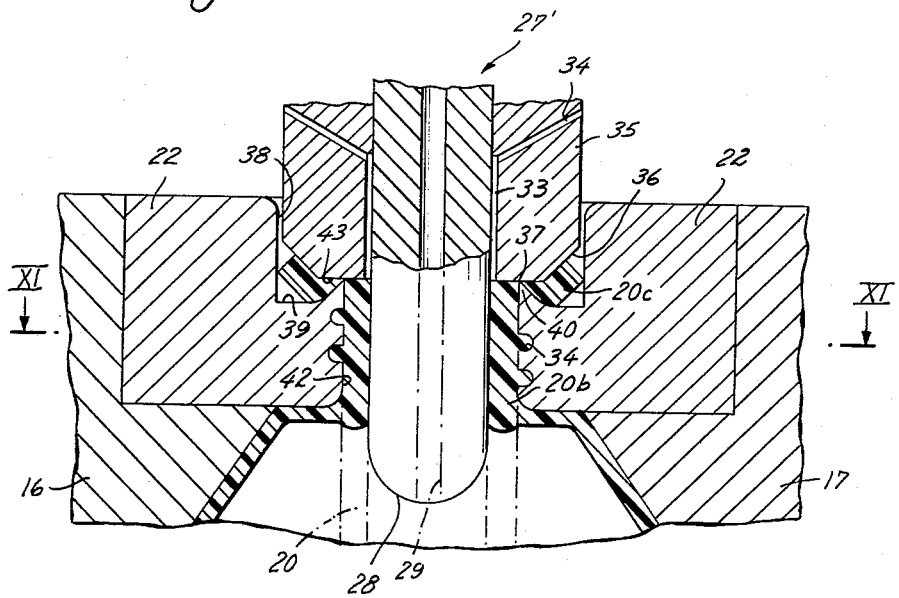
FIG. 10 is a partial cross section similar to FIG. 9 and also drawn to an enlarged scale and showing a different modification of the inlet passage and of the cut-off portion of the blowing nozzle.
Figure 11:
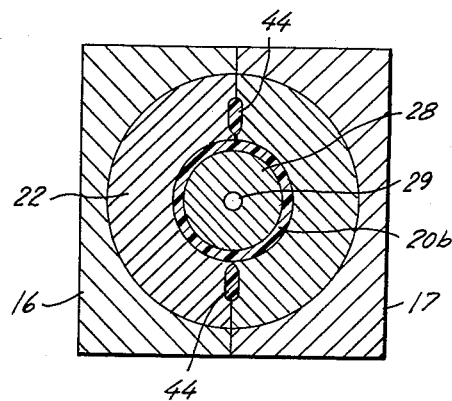
FIG. 11 is a cross section taken along line XI—XI of FIG. 10 and drawn to a smaller scale than FIG. 10.

FIGS. 10 and 11 illustrate a further modification according to the present invention.

The modification illustrated in FIGS. 10 and 11 differs from the modifications shown in FIGS. 7-9 in that the inlet passage into the mold and the cut-off portion of the blowing nozzle are of slightly different configuration. As shown in FIG. 10, the inlet passage formed in the mold inserts 22 has an outer end portion 38 of cylindrical configuration and an inner portion 42, likewise of cylindrical configuration, but of a diameter substantially smaller than that of the portion 38 so as to form a transverse shoulder face 39 between the outer and inner portions of the inlet passage. An annular rim 40 of substantially triangular cross section projects upwardly from an inner portion of the shoulder face 39 and forming an annular cutting edge 37 of a diameter equal to that of the inner portion 42. The inner portion 42 of the inlet passage may also be formed with a screw thread 34 as described before in connection with FIG. 9. The blowing nozzle 27' has again a calibrating portion 28 of an outer diameter to tightly confine between its outer surface and the surface of the inner portion 42 of the inlet passage a portion 20b of a tubular body 20 in the manner as described before. The cut-off portion 35 of the blowing nozzle 27' has an outer diameter slightly smaller than that of the outer portion 38 of the inlet passage so as to fit when inserted therein with a small clearance in the latter. The cut-off portion 35 has a bottom face 43 extending substantially normal to the axis of the blowing nozzle 27' beyond the cutting edge 37 and being preferably bevelled, as shown at 36, to provide a lead in during insertion of the blowing nozzle 27' into the outer end portion 38 of the inlet passage and to facilitate proper centering of the blowing nozzle 27' with respect to the inlet passage. When the blowing nozzle 27' is fully inserted as shown in FIG. 10, the bottom face 43 of the cut-off portion 35 will cooperate with the cutting edge 37 to sever an excess portion 20c from the remainder of the tubular body 20. Engagement of the bottom face 43 with the cutting edge 37 will also stop further inward movement of the blowing nozzle 27' to avoid in this way axial compression of the portion 20b of the tubular portion 20. The blowing nozzle 27' is also provided with air escape passage means 33, 34 for the purpose as described before. After blowing nozzle 27' has been fully inserted, blowing of the bottle proceeds in the manner as described before.

The tubular body 20 may be extruded between the open mold halves with a diameter substantially equal to that of the smallest diameter of the inlet passage. However, the tubular body may also be extruded with a diameter larger than the smallest diameter of the inlet passage and in this case not only the bottom portion of the tubular body 20 will be squeezed together between the faces of the mold halves as shown at 20a in FIG. 8, but also portions of the tubular body 20 located within the inner end portion 42 of the inlet passage will be squeezed together as shown at 44 in FIG. 11. The tubular body 20 is preferably extruded to a diameter larger than that of the smallest diameter of the inlet passage when the major diameter of the finished bottle or container is considerably greater than the diameter of the neck portion thereof.

While proper calibrating of the neck portion of the finished container and cut-off of the excess material at the end of the neck portion has been described as being performed by a blowing nozzle in combination with a specifically configurated inlet passage through which the blowing nozzle is inserted, it will be obvious to an expert working in the field that expansion of the body 20 in the cavity of the mold can be produced not only by blowing compressed air through the bore 29 in the blowing nozzle into the interior of the tubular body, but that such expansion may also be produced by evacuating the air in the mold cavity around the tubular body 20 therein. In this case an elongated member without a central bore and having a calibrating portion and a cut-off portion as described before may be inserted into the upper open end of the tubular body before the air is evacuated from the mold cavity to thus calibrate the neck portion of the container to be formed and to cut off excess material in the manner as described before in conection with the various modifications shown in the drawing.

It will be understood that each of the elements described above, or two or more together, may also find a useful application in other types of bottle or container making machines differing from the types described above.

While the invention has been illustrated and described as embodied in a blowing nozzle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a container blowing machine or the like, in combination, a blow mold including two complementary mold halves defining a cavity having the shape of the container to be molded and including an inlet passage formed in said complementary halves and extending through one end wall of said mold, said inlet passage having an outer end portion of a cross section greater than an inner portion thereof, said blow mold adapted to receive a tubular body of plastic material having a closed end in said mold and extending with an open flaring end through said inlet passage beyond said end wall; a blowing nozzle for insertion into the open end of the tubular body, said blowing nozzle having a calibrating portion of a transverse cross section smaller than that of said inner portion of said inlet passage and adapted to cooperate with said inner portion to confine between its outer surface and the inner surface of said inner portion of said passage a neck of the container to be blown in said blow mold from the tubular body therein, said blowing nozzle having a cut-off portion rearwardly of and coaxially with said calibrating portion and having a transverse cross section greater than that of said inner portion of said passage, said cut-off portion having a bottom face extending transversely to the axis of said nozzle and cooperating with said inlet passage to limit the insertion of said blowing nozzle into said inlet passage and to cut off during insertion of said blowing nozzle into said flaring open end of the body a portion thereof extending beyond said inner portion of said passage, whereby air located in the space in the flaring portion around said calibrating portion will be compressed during inward movement of said blowing nozzle after said cut-off portion of said nozzle has contacted said flaring end portion, said blowing nozzle being formed with air escape passage means communicating at one end thereof with said space, and at another end thereof with the outer atmosphere so that air compressed in said space may escape to the outer atmosphere, whereby forcing of air into the material forming the neck portion of the container is positively avoided and a neck portion free of folds and air enclosures is obtained.

2. A container blowing machine as set forth in claim 1 in which each of said mold halves has an insert at said end wall and said inlet passage being formed in said inserts.

3. A container blowing machine as set forth in claim 1 in which said inner portion of said inlet passage is formed with a screw thread.

4. A container blowing machine as set forth in claim 1 in which said calibrating portion of said blowing nozzle has a tapered free end.

5. In a container blowing machine or the like, in combination, a blow mold including two complementary mold halves defining a cavity having the shape of the container to be molded and including an inlet passage formed in said complementary halves and extending through one end wall of said mold, said inlet passage having an outer substantially frusto-conical end portion and an inner portion of a diameter equal to that of the smallest diameter of said frusto-conical end portion, said blow mold adapted to receive a tubular body of plastic material having a closed end in said mold and extending with an open flaring end through said inlet passage beyond said end wall; a blowing nozzle for insertion into the open end of the tubular body, said blowing nozzle having a calibrating portion of a diameter smaller than that of said inner portion of said inlet passage and adapted to cooperate with said inner portion to confine between its outer surface and the inner surface of said inner portion of said passage a neck of the container to be blown in said blow mold from the tubular body therein, said blowing nozzle having a cut-off portion rearwardly of and coaxially with said calibrating portion, said cut-off portion having a bottom face of a diameter smaller than the largest diameter of said frusto-conical end portion of said inlet passage but greater than said smallest diameter thereof so that the annular edge of the bottom face will engage said frusto-conical end portion of said passage along a circle during insertion of said blowing nozzle into said flaring open end of the body to cut off a portion of said body and to limit further insertion of said nozzle into said inlet passage, whereby air located in the space in the flaring portion around said calibrating portion will be compressed during inward movement of said blowing nozzle after said cut-off portion of said nozzle has contacted said flaring end portion, said blowing nozzle being formed with air escape passage means communicating at one end thereof with said space, and at another end thereof with the outer atmosphere so that air compressed in said space may escape to the outer atmosphere, whereby forcing of air into the material forming the neck portion of the container is positively avoided and a neck portion free of folds and air enclosures is obtained.

6. In a container blowing machine or the like, in combination, a blow mold including two complementary mold halves defining a cavity having the shape of the container to be molded and including an inlet passage formed in said complementary halves and extending through one end wall of said mold, said inlet passage having an outer end portion flaring outwardly along a curve having radii of curvature decreasing toward the outer surface of the mold and an inner substantially cylindrical portion, said blow mold adapted to receive a tubular body of plastic material having a closed end in said mold and extending with an open flaring end through said inlet passage beyond said end wall; a blowing nozzle for insertion into the open end of the tubular body, said blowing nozzle having a calibrating portion of a diameter smaller than that of said inner portion of said inlet passage and adapted to cooperate with said inner portion to confine between its outer surface and the inner surface of said inner portion of said passage a neck of the container to be blown in said blow mold from the tubular body therein, said blowing nozzle having a cut-off portion rearwardly of and coaxially with said calibrating portion, said cut-off portion having a bottom face of a diameter smaller than the largest diameter of said frusto-conical end portion of said inlet passage but greater than said smallest diameter thereof so that the annular edge of the bottom face will engage said outwardly flaring end portion of said passage along a circle during insertion of said blowing nozzle into said flaring open end of the body to cut off a portion of said body and to limit further insertion of said nozzle into said inlet passage, whereby air located in the space in the flaring portion around said calibrating portion will be compressed during inward movement of said blowing nozzle after said cut-off portion of said nozzle has contacted said flaring end portions, said blowing nozzle being formed with air escape passage means communicating at one end thereof with said space, and at another end thereof with the outer atmosphere so that air compressed in said space may escape to the outer atmosphere, whereby forcing of air into the material forming the neck portion of the container is positively avoided and a neck portion free of folds and air enclosures is obtained.

7. In a container blowing machine or the like, in combination, a blow mold including two complementary mold halves defining a cavity having the shape of the container to be molded and including an inlet passage formed in said complementary halves and extending through one end wall of said mold, said inlet passage having an outer substantially cylindrical end portion and an inner end portion coaxial with said outer end portion and of diameter substantially smaller than that of said outer end portion so as to form a transverse face between said portions of said inlet passage, said blow mold adapted to receive a tubular body of plastic material having a closed end in said mold and extending with an open flaring end through said inlet passage beyond said end wall; a blowing nozzle for insertion into the open end of the tubular body, said blowing nozzle having a calibrating portion of a diameter smaller than that of said inner portion of said inlet passage and adapted to cooperate with said inner portion to confine between its outer surface and the inner surface of said inner portion of said passage a neck of the container to be blown in said blow mold from the tubular body therein, said blowing nozzle having a cut-off portion rearwardly of and coaxially with said calibrating portion, said cut-off portion having a bottom face of a diameter smaller than that of said outer end portion of said inlet passage but greater than that of said inner portion thereof, one of said faces being formed with an annular rim projecting therefrom toward the other face and forming an annular cutting edge adapted to engage said other face during insertion of said nozzle into said flaring open end of the body to cut off a portion of said body and to limit further insertion of said nozzle into said inlet passage, whereby air located in the space in the flaring portion around said calibrating portion will be compressed during inward movement of said blowing nozzle after said cut-off portion of said nozzle has contacted said flaring end portion, said blowing nozzle being formed with air escape passage means communicating at one end thereof with said space, and at another end thereof with the outer atmosphere so that air compressed in said space may escape to the outer atmosphere, whereby forcing of air into the material forming the neck portion of the container is positively avoided and a neck portion free of folds and air enclosures is obtained.

8. In a container blowing machine or the like, in combination, a blow mold including two complementary mold halves defining a cavity having the shape of the container to be molded and including an inlet passage formed in said complementary halves and extending through one end wall of said mold, said inlet passage having an outer substantially cylindrical end portion and an inner end portion coaxial with said outer end portion and of diameter substantially smaller than that of said outer end portion so as to form a transverse face between said portions of said inlet passage, said blow mold adapted to receive a tubular body of plastic material having a closed end in said mold and extending with an open flaring end through said inlet passage beyond said end wall; an annular rim of substantially triangular configuration projecting upwardly from said transverse face and forming an annular cutting edge of a diameter equal to that of said inner portion of said inlet passage; a blowing nozzle for insertion into the open end of the tubular body, said blowing nozzle having a calibrating portion of a diameter smaller than that of said inner portion of said inlet passage and adapted to cooperate with said inner portion to confine between its outer surface and the inner surface of said inner portion of said passage a neck of the container to be blown in said blow mold from the tubular body therein, said blowing nozzle having a cut-off portion rearwardly of and coaxially with said calibrating portion, said cut-off portion having a bottom face of a diameter smaller than that of said outer end portion of said inlet passage but greater than that of said inner portion thereof, said bottom face of said cut-off portion engaging, during insertion of said nozzle into said open flaring end of the body, said annular cutting edge to cut off a portion of said body extending beyond said cutting edge and to limit further insertion of said nozzle into said inlet passage, whereby air located in the space in the flaring portion around said calibrating portion will be compressed during inward movement of said blowing nozzle after said cut-off portion of said nozzle has contacted said flaring end portion, said blowing nozzle being formed with air escape passage means communicating at one end thereof with said space, and at another end thereof with the outer atmosphere so that air compressed in said space may escape to the outer atmosphere, whereby forcing of air into the material forming the neck portion of the container is positively avoided and a neck portion free of folds and air enclosures is obtained.

9. In a bottle-making machine or the like, in combination, a mold defining a cavity and an inlet passage leading from said cavity to the exterior of said mold, said passage having an outer end of a transverse cross section greater than that of an inner portion thereof and between said outer end and said inner portion a face extending transverse to the axis of said passage, said mold adapted to receive a tubular body of plastic material having a closed end in said mold and an open end extending through said passage to the exterior of said mold; an elongated member adapted to be inserted into the portion of the tubular body extending through said passage and having a calibrating end portion of a transverse cross section smaller than that of said inner portion of said passage and adapted to cooperate with said inner portion to confine between its outer surface and the inner surface of said inner portion of said passage a neck of a bottle to be formed in said mold from the tubular body therein, said elongated member having a cut-off portion rearwardly of and coaxially with said calibrating portion and having a bottom face extending transversely to the axis of said elongated member and having a transverse cross section greater than that of said inner portion but smaller than that of said outer end of said passage, one of said faces forming a cutting edge engaging during insertion of said elongated member into the portion of said tubular body located in said passage the other of said faces to cut off a portion of the tubular body extending beyond said cutting edge while simultaneously limiting further insertion of said elongated member into said passage so as to prevent compression of the remainder of the tubular body in axial direction; and means to expand said tubular body against its surface of said mold cavity.

10. In a bottle-making machine or the like, in combination, a mold defining a cavity and an inlet passage leading from said cavity to the exterior of said mold, said passage having an outer end of a transverse cross section greater than that of an inner portion thereof and between said outer end and said inner portion a face extending transverse to the axis of said passage, said mold adapted to receive a tubular body of plastic material having a closed end in said mold and an open end extending through said passage to the exterior of said mold; an elongated member adapted to be inserted into the portion of the tubular body extending through said passage and having a calibrating end portion of a transverse cross section smaller than that of said inner portion of said passage and adapted to cooperate with said inner portion to confine between its outer surface and the inner surface of said inner portion of said passage a neck of a bottle to be formed in said mold from the tubular body therein, said elongated member having a cut-off portion rearwardly of and coaxially with said calibrating portion and having a bottom face extending transversely to the axis of said elongated member and having a transverse cross section greater than that of said inner portion but smaller than that of said outer end of said passage, one of said faces forming a cutting edge engaging during insertion of said elongated member into the portion of said tubular body located in said passage the other of said faces to cut off a portion of the tubular body extending beyond said cutting edge while simultaneously limiting further insertion of said elongated member into said passage so as to prevent compression of the remainder of the tubular body in axial direction, the portion of said passage between said outer end and said inner portion shaped so as to center said elongated member during insertion thereof into said passage with respect to the latter; and means to expand said tubular body against its surface of said mold cavity.

11. In a container blowing machine or the like, in combination, a blow mold including at least two complementary mold sections defining a cavity having the shape of the container to be molded and including an inlet passage formed in the region of one end wall of the mold in said complementary mold sections, said blow mold adapted to receive a tubular body of plastic material having a closed end in said mold and extending with an open flaring end through said inlet passage beyond said end wall; a blowing nozzle for insertion into the open end of the tubular body, said blowing nozzle having a calibrating portion of a transverse cross section smaller than that of said inlet passage and adapted to cooperate therewith to define between its outer surface and the inner surface of said passage a neck of the container to be blown in said blow mold from the tubular body therein, said blowing nozzle having a cut-off portion rearwardly of and coaxially with said calibrating portion and having a transverse cross section greater than that of said passage, said cut-off portion having a bottom face extending transversely to the axis of said blowing nozzle and adapted to cooperate with a portion of said end wall around said passage to cut off during insertion of said blowing nozzle into the flaring open end of the body a portion thereof extending beyond said end wall, whereby air located in the space in the flaring portion around said calibrating portion will be compressed during inward movement of said blowing nozzle after said cut-off portion of said nozzle has contacted said flaring end portion, said blowing nozzle being formed with air escape passage means communicating at one end thereof with said space and at another end thereof with the outer atmosphere so that air compressed in said space may escape to the outer atmosphere, whereby forcing of air into the material forming the neck portion of the container is positively avoided and a neck portion free of folds and air enclosures is obtained.

References Cited by the Examiner
UNITED STATES PATENTS

| | | | |
|---|---|---|---|
| 2,890,483 | 6/59 | Soubier | 18—5 |
| 2,930,079 | 3/60 | Parfre | 264—99 |
| 2,984,865 | 5/61 | Mumford | 18—5 X |
| 3,009,196 | 11/61 | Hagen | 18—5 X |
| 3,029,467 | 4/62 | Nelson | 18—5 |
| 3,032,809 | 5/62 | Willard | 18—5 |

WILLIAM J. STEPHENSON, *Primary Examiner.*

MICHAEL V. BRINDISI, *Examiner.*